Patented Nov. 21, 1922.

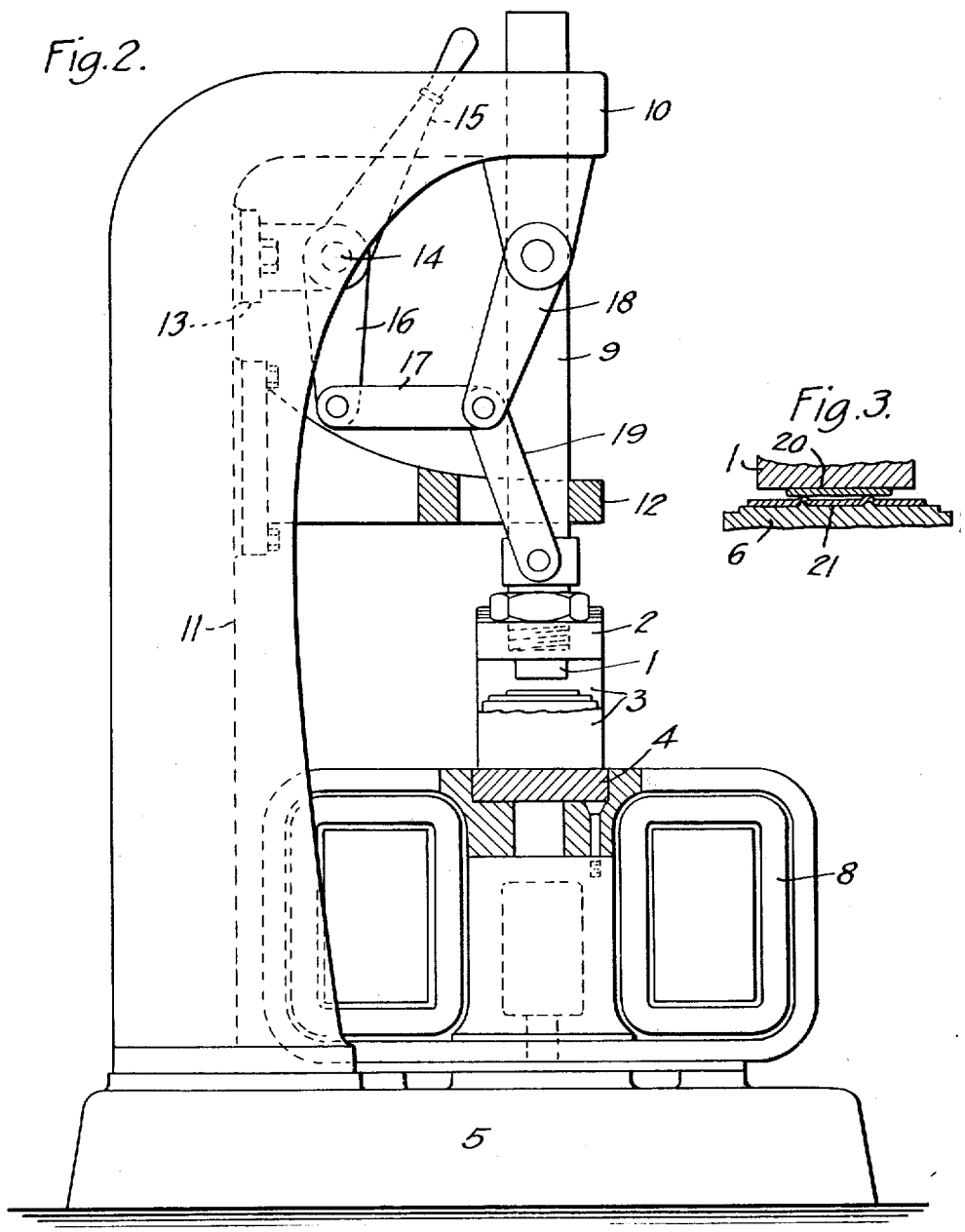

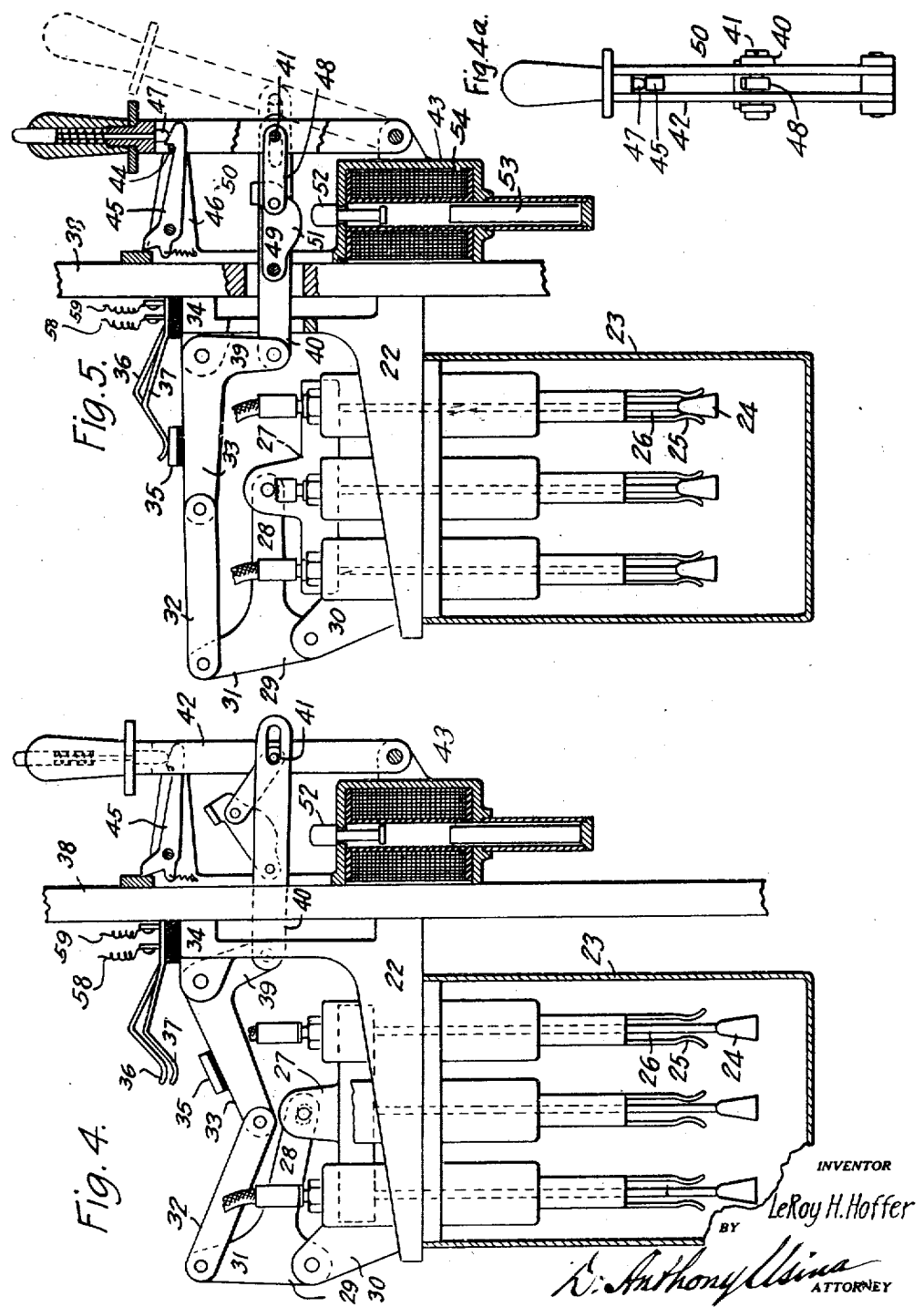

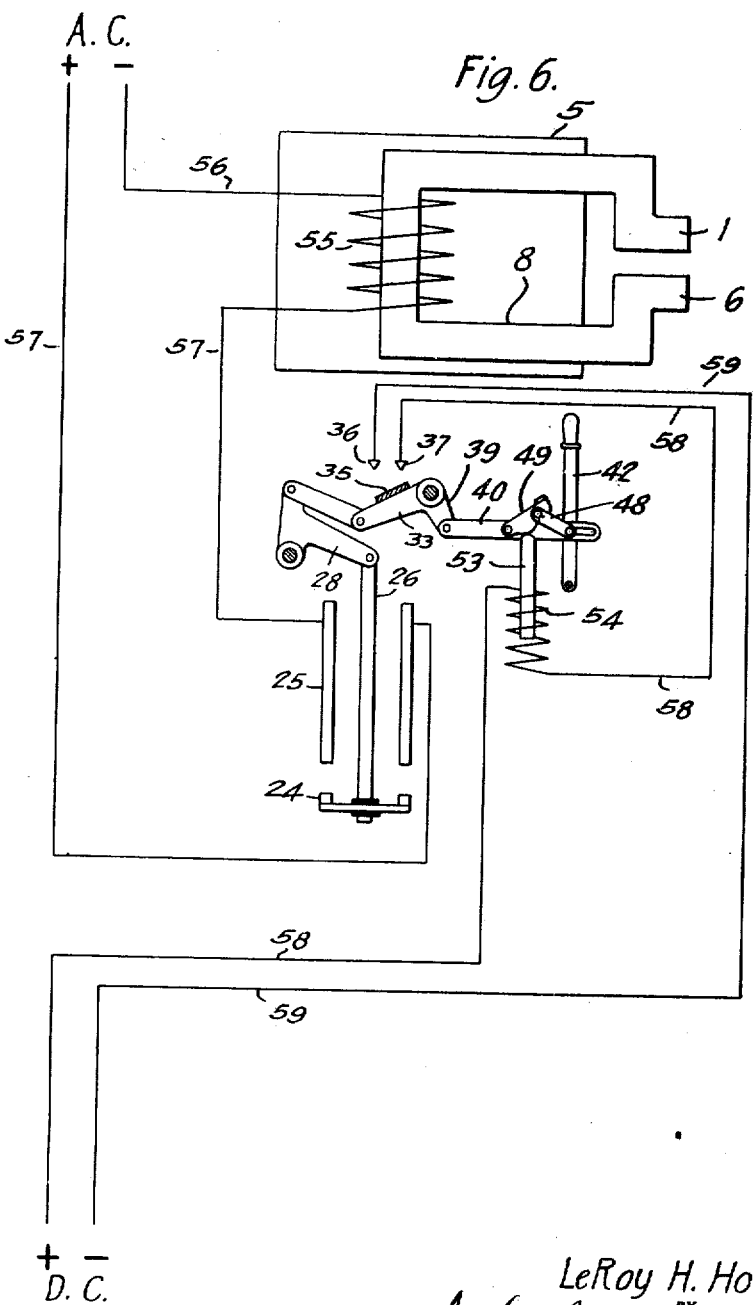

1,436,395

UNITED STATES PATENT OFFICE.

LE ROY H. HOFFER, OF NYACK, NEW YORK, ASSIGNOR TO THOMAS E. MURRAY, OF BROOKLYN, NEW YORK.

ELECTRIC WELDING AND THE LIKE.

Application filed February 18, 1921. Serial No. 445,972.

*To all whom it may concern:*

Be it known that I, LE ROY H. HOFFER, a citizen of the United States, and resident of Nyack, New York, have invented certain new and useful Improvements in Electric Welding and the like, of which the following is a specification.

My invention aims to provide an improved apparatus and method for electric welding and particularly for controlling the application of the current which is used to heat and soften the parts to be welded. The same method of control may be applied to riveting and similar operations where the metal is to be heated by an electric current and thus softened and afterwards mechanically manipulated.

The accompanying drawings illustrate the principal parts of an electric welding machine embodying my invention.

Figs. 1 and 2 are respectively a face elevation and a vertical section of an apparatus for the projection welding of two pieces of sheet metal;

Fig. 3 is a diagrammatic detail illustrating the electrodes and the work in position before the welding operation commences;

Figs. 4 and 5 are side elevations partly in section, illustrating the method of controlling the current, the mechanism being shown in two different positions in the respective figures; Fig. 4ª is a detail of the hand lever in Fig. 4;

Fig. 6 is a diagram of the electrical connections and controlling mechanism.

Figure 1:
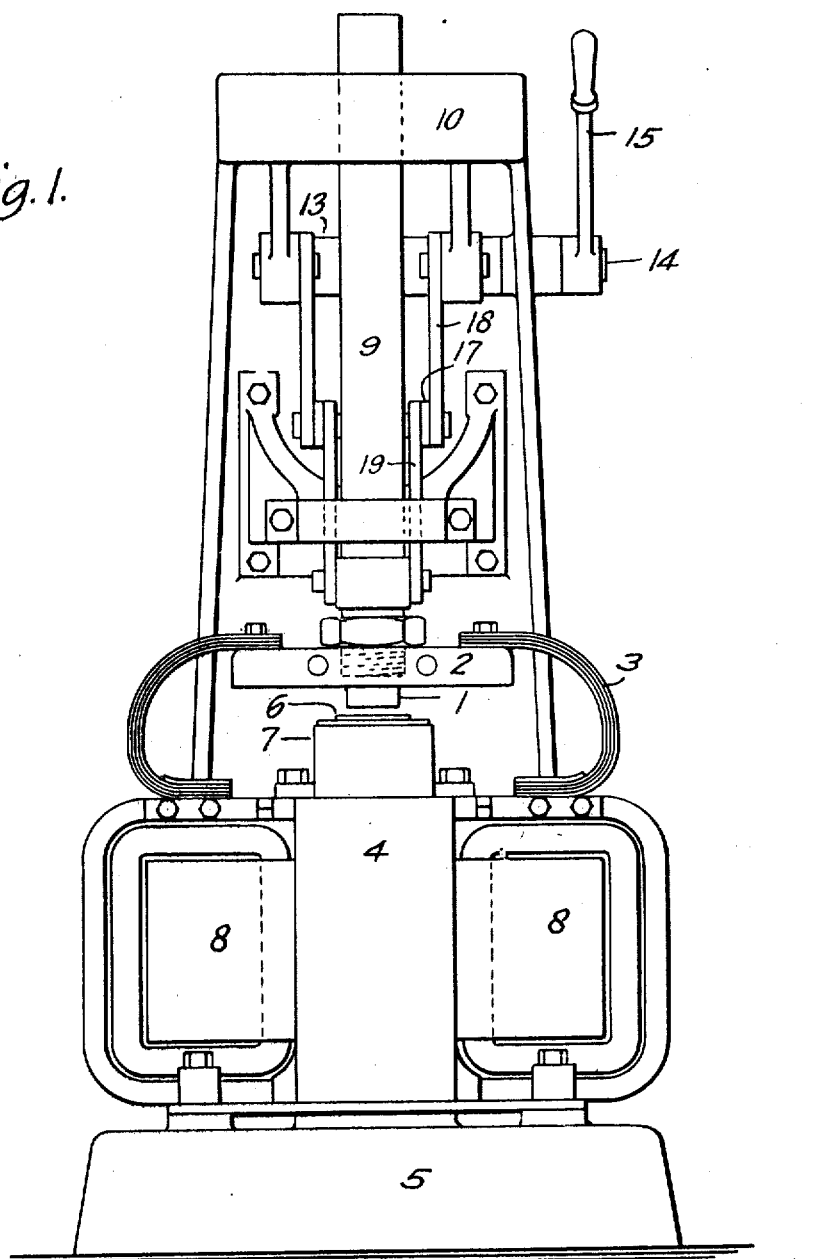

Referring to the embodiment of the invention illustrated, the upper electrode 1 is mounted on a head 2 supported by laminated copper bars 3 mounted on the standard 4 which extends upward from a base 5. The lower electrode 6 is carried by a holder 7 which is also mounted on the top of the standard 4. At each side of the standard 4 are the transformers 8 supported also on the base 5. The details of the transformers and their connections to the electrodes may be of any usual or suitable type and are therefore not illustrated. The electrodes 1 and 6 are detachably mounted in their carriers, so that electrodes of different shapes may be substituted for each other to fit the shape of the parts to be welded and the character of the work to be done.

The electrodes may be moved together on the work by any usual or suitable mechanism. As shown in Fig. 2 the upper electrode is movable, being mounted on the lower end of a rod 9 sliding in an upper arm 10 on a post 11 mounted on the base 5, and is guided at its lower portion in a bracket 12 extending forward from the post 11. A second bracket 13 carries a shaft 14 which may be rocked by means of a hand lever 15 and which carries depending arms 16 connected by links 17 to the meeting end of a toggle joint consisting of arms 18 fixed at the upper end and arms 19 pivotally connected at the lower end to the rod 9. By means of this toggle the upper electrode is pressed down to clamp the work between it and the lower electrode with a heavy mechanical pressure sufficient for the welding operation.

As shown, for example in Fig. 3, the electrodes 1 and 6 are of copper and a pair of plates 20 and 21 are to be welded together; the latter having upward projections thereon at intervals, and the lower electrode being shaped to enter said projections. The pressing of the electrodes together causes a slight flattening of the ends of the projections sufficient to secure a good contact for the passage of the current and for the softening of the metal of the two plates at their points of contact. This is what is called "projection welding", and the projections may be so slight and the electrodes so shaped as to permit the pressing of the plates practically or nearly into engagement with each other, leaving, however, only at the projection points a sufficiently close and intimate contact to form a weld.

The method preferably used consists in the passing of a current of very high amperage through the metal for a very brief interval of time. With this method, and particularly in projection welding, the take-up of the metal, that is to say the movement of the two sheets toward each other after they become softened by the current, is so slight and the welding operation is so rapid that it is difficult, and for some classes of work impossible, to provide a positive take-up mechanism which will be quick enough and will operate for so short an interval of time as the circumstances require. We propose, therefore, for this and similar cases to use a method in which the time element is determined merely by the lag in the operation of an electric device. The initial pressure of the electrodes on the work, with the elasticity inherent in the different parts of the machine is sufficient to produce the desired take-up, and the same operation which closes the welding circuit through one switch operates another switch to open the circuit.

The method preferably employed is that of Murray, Patent No. 1,281,636 of October 15, 1918 in which a current of extremely high ampere strength and of very brief duration is used. With such a process we have found that there is a peculiar advantage in first applying a heavy mechanical pressure to the parts to be welded and then passing the current through them. The initial mechanical pressure is such as to bring the parts into intimate contact with each other and with the electrodes so as to form a path of maximum conductivity and through which will pass approximately the maximum volume of current which can be obtained from the transformer or other source of supply, and to pass this maximum current immediately on the closing of the welding circuit, instead of having to await the passage of the current and the softening of the parts before securing the maximum current as is the case where such a heavy initial pressure is not provided. The securing of approximately the maximum volume of current from the very beginning of its passage shortens the necessary duration of the current and the take-up period.

The electric control mechanism may be mounted directly on the welding machine, or may be separately mounted adjacent thereto. It is shown in Figs. 4 and 5 mounted on a bracket 22 from which is suspended an oil switch, of any usual or suitable type, illustrated diagrammatically at 23. In Fig. 4 the oil switch is shown open, its movable contacts 24 being drawn downward out of engagement with its depending fixed contacts 25. The movable contacts are supported by means of rods 26 from crossheads 27, one at each side of the switch, these being pivotally connected to an arm 28 of a three-armed link or lever having a second arm 29 pivotally supported on an arm 30 extending up from the bracket 22. The third arm 31 is connected by a link 32 to the arm 33 of a bell crank lever which is pivotally supported on a post 34 also carried by the bracket 22. The bell crank lever carries a contact 35 adapted to bridge the space between a pair of contacts 36 and 37 mounted on the upwardly projecting post 34 of the bracket which carries the oil switch. Thus the bracket 22 carries an oil switch and an air switch. As the arm 33 swings upward it first closes the air switch, after which the spring terminals 36 and 37 yield and, on the continuation of the upward movement of the arm 33, the contacts 24 of the oil switch close the latter by engagement with the contacts 25. On the reverse, or downward, movement of the arm 33 the oil switch is first opened, the terminals 36 and 37 following the arm 33 downward during this period, and the arm then opens the air switch by movement of the contact 35 downward from the terminals 36 and 37.

A plate 38 mounted on the side of the bracket 22 carries the hand mechanism for closing the oil and air switches described, and carries also a device for opening these switches. The arm 39 of the bell crank lever above referred to is pivotally connected at its lower end to a pair of links 40 which have a slotted engagement with a pin 41 passing through an operating handle 42 which is pivoted at its lower end to a bracket 43 on the plate 38 and which at its upper end has a pin 44 adapted to engage a spring pawl 45 mounted between arms 46 projecting from the plate 38. The hand lever has a releasing pin 47 adapted when pressed down by the thumb of the operator to force the spring pawl out of engagement with the pin 44 so as to allow the hand lever to be pulled outward, as in dotted lines in Fig. 5.

The pin 41 is mounted in the end of a link 48 with its end entering a slot in the lever 42, as shown in Fig. 4ª, and is pivoted to a link 49 which in turn is pivoted to the slides or links 40. The link 49 has at its upper end a projection 50 adapted to come down on the links 40 to limit the downward movement of the parts to the position shown in Fig. 5, thus forming a sort of rule joint. On the underside of the link 49 is a projection 51 in the path of a pin 52 adapted to be engaged at its lower end by the core 53 of an electro-magnet 54 mounted in the bracket 43.

Starting from the position of Fig. 4, the pulling of the hand lever 42 outward, to the dotted line position of Fig. 5, will cause the links 48 and 49 to drop to a position of alignment or slightly below this position and to lock there, thus bringing the hand lever, through the pin 41, into positive engagement with a pair of links 40 and the arm 39 of the bell crank which operates the main switches. Then when the hand lever is pushed inward, to the full line position of Fig. 5, it will shift the bell crank lever 33, 39 accordingly and will close the main switches, the hand lever being at the same time locked in this position by the pawl 45. The circuit of the electro-magnet 54 being closed, its core 53 will be pulled upward and the striker 52 will break the rule joint connection between the links 48 and 49, restoring these to the position of Fig. 4; whereupon the weight of the parts, or any suitably arranged springs, will drop the contacts 24 and open the oil switch and immediately thereafter open the air switch at 35 as above described. For each operation of the machine, therefore, the operator pulls the hand lever out to set the mechanism and then throws it in to operate, and the solenoid automatically breaks the setting of the parts and causes the switches to open.

Fig. 6 illustrates the circuits. The base 5 of the machine and the transformers 8 and electrodes 1 and 6 are indicated only diagrammatically. The secondary coil 55 of the transformer is connected to wires 56 and 57 of an alternating current supply and the circuit is provided with the oil switch 24, 25. The air switch 35, 36, 37 is in a circuit which is not in series with the welding circuit and which preferably leads through wires 58 and 59 to a separate direct current source. The coil 54 of the tripping solenoid is interposed in the wire 58. It will be seen, therefore, that the movement which closes the oil switch also closes the air switch and the circuit of the solenoid, and the duration of the welding current depends on the lag in the circuit of the solenoid. As soon as the latter takes effect the operative connection of the hand lever to the switches is broken or rendered ineffective and the weights or springs referred to cause the welding circuit to be broken. A single operation starts the welding current and starts the breaking current. The welding current flows in such large volume from the beginning, due largely to the heavy pressure with which the plates have been pressed together, that the weld is practically complete by the time that the tripping circuit has become effective. The welded parts harden almost as soon as the welding current is broken, though the take-up may continue for a brief interval after the current is off.

Though I have described with great particularity of detail certain specific embodiments of my invention, yet it is not to be understood therefrom that the invention is restricted to the particular embodiments disclosed. Various modifications in detail and in the arrangement of the parts may be made by those skilled in the art without departure from the invention as defined in the following claims.

What I claim is:

1. The method of regulating the duration of the current in a machine for electric welding and the like, which includes closing the welding circuit and simultaneously passing a current through a device which cuts off the welding current.

2. The method of controlling the current in a machine for electric welding and the like which consists in limiting the duration of the welding current to the lag in operation of an electric mechanism.

3. The method of controlling the current in a machine for electric welding and the like which consists in limiting the duration of the welding current to the lag in operation of an electric mechanism which is not in series with the welding circuit.

4. The method of controlling the current in a machine for electric welding and the like with a small predetermined take-up which consists in limiting the duration of the welding current to the lag in operation of an electric mechanism.

5. The method of regulating the duration of the current in a machine for electric welding and the like, which includes closing the welding circuit and simultaneously closing a secondary circuit and utilizing this secondary circuit to open the welding circuit.

6. The method of regulating the duration of the current in a machine for electric welding and the like, which includes closing the welding circuit through an oil switch and simultaneously closing an air switch in a secondary circuit which operates mechanism for opening the oil switch.

7. The method of projection welding which includes pressing together the parts to be welded, with projections on the one engaging the other, passing a welding current through said parts, and limiting the duration of the welding current by the lag in operation of an electric mechanism.

8. The method of electric welding which includes first applying a heavy mechanical pressure to the parts to be welded, and then passing through them an electric current of very high amperage for a very brief duration of time, the initial pressure being such as to bring the parts into intimate contact with each other and with the electrodes so as to provide for the passage of approximately the maximum volume of current immediately on the closing of the welding circuit and thus to shorten the duration of the current and the take-up period, and limiting the duration of the welding current by the lag in operation of an electric mechanism.

9. An apparatus of the class described comprising in combination a switch closing mechanism and means actuated on the closing of said switch for effecting the opening thereof.

10. An apparatus of the class described including in combination a welding circuit, a secondary circuit, means for closing both said circuits at one operation and means actuated by the closing of the secondary circuit for cutting off the welding current.

11. An apparatus of the class described including in combination a welding circuit, a secondary circuit, means for closing both said circuits at one operation and means actuated by the closing of the secondary circuit for opening the welding circuit and the secondary circuit.

12. An apparatus of the class described including in combination a welding circuit in which is an oil switch and a secondary circuit in which is an air switch, means for closing said switches in the same operation and means actuated on the closing of the secondary circuit for opening said oil switch.

13. An apparatus of the class described including in combination a welding circuit in which is an oil switch and a secondary circuit in which is an air switch, means for closing said switches in the same operation and means actuated on the closing of the secondary circuit for opening said oil switch and said air switch.

14. An apparatus of the class described including in combination a switch closing mechanism and means actuated on the closing of said switch for rendering said switch closing mechanism ineffective.

15. An apparatus of the class described including in combination a welding circuit in which is an oil switch and a secondary circuit in which is an air switch, means for closing said switches in the same operation and means actuated on the closing of the secondary circuit for breaking the operative connection of said closing means to the switches.

In witness whereof, I have hereunto signed my name.

LE ROY H. HOFFER.